United States Patent Office 2,850,445
Patented Sept. 2, 1958

2,850,445

PHOTOPOLYMERIZATION

Gerald Oster, New York, N. Y.

No Drawing. Application January 19, 1955
Serial No. 482,867

10 Claims. (Cl. 204—158)

This invention relates to photopolymerization. The invention more particularly relates to the polymerization of polymerizable vinyl compounds using visible light as the polymerization initiator.

It has been proposed to initiate the polymerization of vinyl compounds by irradiation using sensitizers such as peroxide, halogenated alkyl aromatic compounds, diketone compounds, azonitrile, etc. Irradiation in the visible light range, however, is not effective for this polymerization and the relatively shorter, higher energy wave lengths as, for example, in the ultraviolet range, are required.

One object of this invention is to effect the polymerization of polymerizable vinyl compounds, using electromagnetic radiation within the visible light range as the polymerization exciter. This, and still further objects, will become apparent from the following description.

In accordance with the invention, I have discovered that a polymerizable vinyl compound in a liquid system containing a photo-reducible dye, a mild reducing agent, and preferably in the presence of oxygen, will become polymerized upon irradiation with visible light.

The starting vinyl compound may comprise any of the known polymerizable organic vinyl compounds, and preferably polymerizable vinyl monomers, such as acrylonitrile, methacrylonitrile, methacrylic acid, acrylic acid, acrylamide, methacrylamide, vinylpyrillidone, vinyl acetate, methyl methacrylate, methyl acrylate, styrene, etc.

The starting vinyl compound should preferably be a water-soluble monomer which produces a water-insoluble polymer upon polymerization.

The dyes which may be used in accordance with the invention comprise any of the known dyes which are capable of forming a stable system with a reducing agent in the dark but which will undergo reduction when irradiated with visible light in the presence of the reducing agent, such dyes are included as, for example, rose bengal, phloxine, erythrosine, eosine, fluorescene, acriflavine, rhodamine B, methyl violet, brilliant green, thionine, methyl orange, riboflavine, water soluble and fat-soluble chlorophylls and hematoporphyrin.

The reducing agents which may be used in accordance with the invention comprise any known reducing agents which, in combination with the particular dye in question, will form a stable system in the dark which will not undergo reduction but which will cause reduction of the dye upon irradiation with visible light. The reduction potential of the reducing agent should thus be less than that necessary to reduce the particular dye in question in the absence of visible light. These reducing agents will be referred to herein and in the claims as mild reducing agents and include, for example, stannous chloride, ascorbic acid, glutathione, hydroxylamine, hydrazine, phenyl hydrazine, dichlorphenyl hydrazine, thiourea, and allyl thiourea.

When the starting vinyl compound constitutes a reduction agent itself and has a sufficient reduction potential to reduce the particular dye in question when irradiated with visible light, as, for example, in the case of acrylamide and riboflavine, the presence of an additional reducing agent is not necessary, though the same may enhance the speed of the polymerization.

The polymerization is preferably effected in the presence of oxygen, such as the ambient atmosphere. It has been found that the polymerization proceeds substantially more rapidly in the presence of this oxygen than when a portion of the normally present oxygen has been removed from the polymerization solution.

The vinyl compound, dye and the reducing agent should be present in a true liquid system, i. e., in the form of a solution.

While the concentration of the dye in the solution is not critical, most efficient results are obtained when the concentration is adjusted so that at least about 95% of the incident light striking the solution and having a wave length corresponding to the absorption maximum of the dye is absorbed.

Similarly, the amounts of the reducing agent are not critical and amounts from 0.1% by weight to the maximum of solubility of the reducing agent in the solution have proven effective.

In the case of certain dyes which are acid sensitive as, for example, riboflavine, when using an acid reducing agent, it may be necessary to buffer the solution as, for example, with a phosphate buffer to obtain a neutral pH.

The solution of the vinyl compound and the reducing agent and the dye is preferably present in a solvent in which the vinyl monomer is soluble but in which the polymer formed therefrom is insoluble. Such a solvent is, for example, water when acrylonitrile is used as the monomer.

In order to effect the polymerization, the system is merely irradiated with visible light. By visible light there is meant light having wave lengths between about 400 and 760 millimicrons.

Actually, it is only necessary to irradiate with the wave length for which the particular dye in question has a maximum absorption. Since, by very definition, the dye is a colored substance, this wave length of maximum absorption will always be in the visible light range. Therefore, in all cases it is merely necessary to irradiate with visible light.

The degree of the polymerization is generally roughly proportional to the amount of light absorbed by the dye, and the polymerization speed is roughly proportional to the intensity of the light absorbed.

The polymer formed generally precipitates out of the solution in the form of divided material such as a powder and may be worked up in the conventional manner for producing plastic materials, etc.

The complete polymerization proceeds extremely rapidly as, for example, within several minutes or even seconds, depending upon the intensity of the light, and no heat or pressure is required.

The starting solution is not limited to a solution containing a single vinyl compound, reducing agent and dye, and the same may contain several vinyl compounds and/or reducing agents and/or dyes.

The invention is particularly applicable for the continuous production of polyvinyl compounds. For the continuous working of the process it is merely necessary to continuously feed the polymerizable vinyl compound such as the vinyl monomer into the solution and continuously remove the polymer which precipitates out. The dye and reducing agent retain their activity for an extremely long period of time and are useful for the polymerization of a relatively large amount of the polymer.

Thus, an aqueous solution containing, for example, the dye and reducing agent may be saturated with acrylonitrile and irradiated with visible light. As the polyacrylonitrile forms and separates out at the bottom, additional acrylonitrile may be dissolved in the solution by maintaining the same floating on the top of the solution.

The following examples are given by way of illustration and not limitation. In the examples all of the percentages and proportions are given by weight.

Example 1

A methanol solution containing 20% of methyl methacrylate, 0.007% of rose bengal, and 0.2% phenyl hydrazine was irradiated at a distance of 5 centimeters with a water-cooled 100 watt tungsten lamp using a green glass light filter. A flocculent precipitate was formed. The precipitate was soluble in acetone and proved to be polymethyl methacrylate of molecular weight about 100,000.

Example 2

A water solution containing 15% of calcium acrylate, 0.003% of acriflavine hydrochloride, 0.3% of acidified stannous chloride (made from a 10% water solution of stannous chloride at pH 1.0) was irradiated at a distance of 10 centimeters with a 250 watt tungsten lamp. A flocculent precipitate of polycalcium acrylate was formed. This precipitate is insoluble in all common organic solvents (e. g. acetone, ether, benzene, chloroform).

Example 3

A 50–50 mixture of benzene and ethanol containing 20% of styrene, 0.005% of fat-soluble chlorophyll, and 0.1% of dichlorphenyl hydrazine was irradiated with a water-cooled 100 watt mercury lamp using a blue glass light filter. A flocculent precipitate was formed. The precipitate is soluble in pure benzene and was found to be polystyrene having a molecular weight of about 50,000.

Example 4

A 25–75 mixture of methanol and water containing 10% of acrylamide, 0.001% of riboflavine was irradiated with a 500 watt tungsten lamp using a blue glass light filter. A flocculent precipitate is formed. The precipitate is soluble in pure water and was found to be polyacrylamide with a molecular weight about 10,000. Higher molecular weights are obtained by using less methanol in the starting mixtures.

Example 5

A water solution containing 7% of acrylonitrile, 0.001% of erythrosine, and 0.05% of allyl thiourea was irradiated with a 300 watt tungsten lamp at a distance of 10 centimeters. A flocculent precipitate is formed which is insoluble except in certain special solvents such as dimethyl formamide. The precipitate is polyacrylamide of molecular weight of about 72,000.

Example 6

A water solution containing 7% acrylonitrile, 5% of acrylamide, 0.001% phloxine, and 0.1% of ascorbic acid was irradiated with a 300 watt tungsten lamp at a distance of 10 centimeters. A flocculent precipitate is formed which is a copolymer of acrylonitrile and acrylamide.

Example 7

A water solution containing 7% acrylonitrile, 0.01% of acriflavine, 0.2% of ascorbic acid was irradiated with a 500 watt tungsten lamp at a distance of 12 centimeters. In this example the solution was covered with 3 grams of pure acrylonitrile (the solubility of this monomer in water is 7%). A flocculent precipitate was continually formed until the acrylonitrile above the solution was consumed.

Example 8

A water solution containing 7% acrylonitrile, 0.01% of acriflavine, 0.1% of acidified stannous chloride was irradiated with a 500 watt tungsten lamp at a distance of 15 centimeters. In the complete absence of oxygen no flocculent precipitate was formed and no polymer was produced. If now the solution is equilibrated with atmospheric oxygen and then irradiated, a flocculent precipitate of polyacrylonitrile is formed.

Example 9

Example 5 was repeated except that erythrosine and allyl thiourea were replaced by one of the following dye-reducing agent combinations: rose bengal and thiourea, phloxine and phenyl hydrazine, eosin and glutathione, water-soluble chlorophyll and allyl thiourea, brilliant green and allyl thiourea, hematoporphyrin hydrochloride and allyl thiourea, and comparable results were obtained.

I claim:

1. Process for the continuous production of vinyl polymers which comprises substantially continuously dissolving a quantity of a polymerizable vinyl compound in a liquid body of a solvent for said polymerizable vinyl compound and a substantially non-solvent for the polymer thereof containing an organic photo-reducible dye and a reducing agent having a reduction potential incapable of reducing said dye in the absence of light, but of sufficient strength to reduce the photo-excited dye and oxygen, substantially continuously irradiating said liquid body with visible light to substantially continuously polymerize the dissolved polymerizable vinyl compound and to substantially continuously precipitate out the polymer of said polymerizable vinyl compound formed, said dye and reducing agent being initially present in sufficient amount to produce free radicals for the polymerization of said polymerizable vinyl compound when irradiated with visible light.

2. Process according to claim 1 in which said photoreducible dye is a member selected from the group consisting of rose bengal, phloxine, erythrosine, eosin, fluorescein, acriflavine, rhodamine B, methyl violet, brilliant green, thionine, methyl orange, riboflavine, water-soluble and fat-soluble chlorophylls, and hematoporphyrin.

3. Process according to claim 1 in which said reducing agent is a member selected from the group consisting of stannous chloride, ascorbic acid, glutathione, hydroxylamine, hydrazine, phenyl hydrazine, dichlorphenyl hydrazine, thiourea, and allyl thiourea.

4. Process according to claim 1 in which said photoreducible dye is a member selected from the group consisting of rose bengal, phloxine, erythrosine, eosin, fluorescein, acriflavine, rhodamine B, methyl violet, brilliant green, thionine, methyl orange, riboflavine, water-soluble and fat-soluble chlorophylls and hematoporphyrin, and in which said reducing agent is a member selected from the group consisting of stannous chloride, ascorbic acid, glutathione, hydroxylamine, hydrazine, phenyl hydrazine, dichlorphenyl hydrazine, thiourea, and allyl thiourea.

5. Process according to claim 1 in which said polymerizable vinyl compound is a member selected from the group consisting of acrylonitrile, methacrylonitrile, methacrylic acid, acrylic acid, acrylamide, methacrylamide, vinylpyrrolidone, vinyl acetate, methylmethacrylate, methylacrylate and styrene.

6. Process according to claim 1 in which said reducing agent is present in amount ranging from about .001% by weight to the maximum solubility in the solution.

7. Process according to claim 1 in which said body of liquid has a pH of about 7.

8. Process according to claim 1 in which said dye is present in amount sufficient to absorb at least 95% of the incident light striking the solution in the wave length of its maximum absorption.

9. Process according to claim 1 in which said dissolving is effected by maintaining undissolved polymerizable vinyl compound in contact with said body of liquid to thereby maintain said body of liquid saturated with said polymerizable vinyl compound with further quantities of said polymerizable vinyl compound dissolving in said body of liquid as said polymer precipitates out of said body of liquid.

10. Process for the continuous production of vinyl polymers which comprises irradiating with visible light a liquid solution containing acrylamide and a material capable of being reduced in the presence of said acrylamide when irradiated with visible light to produce free radicals for the polymerization of said acrylamide, said material consisting of riboflavine, and recovering the polyacrylamide formed.

References Cited in the file of this patent

UNITED STATES PATENTS 2,543,817    Weil ------------------ Mar. 6, 1951

OTHER REFERENCES

Oster, Photographic Engineering, vol. 4, No. 3 (1953), pp. 173–178.

UNITED STATES PATENT OFFICE

CERTIFICATE OF CORRECTION

Patent No. 2,850,445                      September 2, 1958

Gerald Oster

It is hereby certified that error appears in the printed specification of the above numbered patent requiring correction and that the said Letters Patent should read as corrected below.

Column 2, line 21, after "from" insert -- about --.

Signed and sealed this 4th day of November 1958.

(SEAL)

Attest:

KARL H. AXLINE
Attesting Officer

ROBERT C. WATSON
Commissioner of Patents